INVENTORS
ROBERT E. BRUMBACH AND
HANS R. JOHANSEN

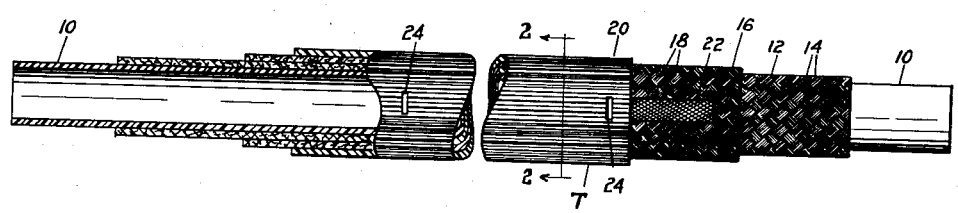
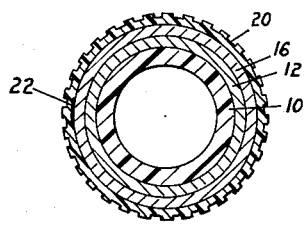
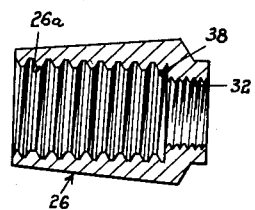
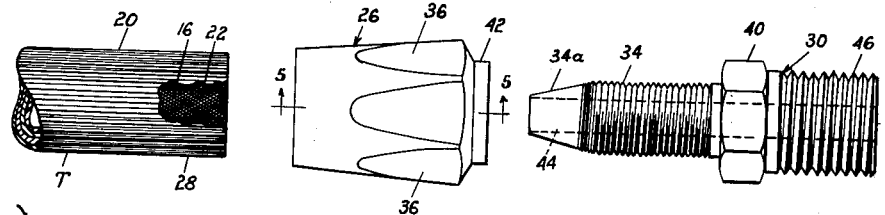
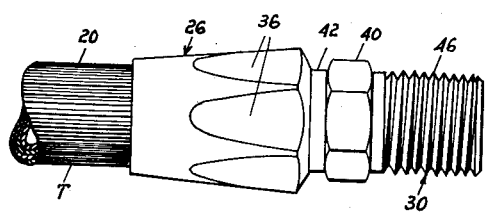

United States Patent Office 3,042,737
Patented July 3, 1962

3,042,737
HOSE ASSEMBLY INCORPORATING A
GROUND WIRE
Robert E. Brumbach and Hans A. Johansen, Mantua,
Ohio, assignors to Samuel Moore & Company, Mantua,
Ohio, a corporation of Ohio
Filed May 20, 1960, Ser. No. 30,614
5 Claims. (Cl. 174—47)

This invention relates in general to composite tubing for use in connection with mechanical devices for transmission of fluid under high pressure, and more particularly to tubing having static discharge means, such as a metallic wire, incorporated therewith and extending axially therealong.

An example of the use of the present composite tubing is in paint spraying mechanism wherein the tubing is utilized to carry the paint between a pump and a flow gun. In such mechanism, the paint is carried under fairly high pressure. Accordingly the tubing must be durable and of a relatively high strength. Such high strength and durability may be provided by the use of an inner pipe or tube of polymeric-like material, such as extruded nylon, on which may be wrapped at least one braided layer of poly (alkylene terephthalate) ester, as a reinforcing member. Surrounding the inner tube there is provided an outer sheath of polymeric material, such as nylon, which again is desirably extruded over the reinforcing member, to provide a durable and high strength tubing of more or less semi-rigid nature, and resistant to ultraviolet light, abrasion and most organic liquids, water, etc.

However, it has been found that the friction of the fluid, such as paint, passing through the inner nylon tube produces an electrical charge on the tubing, which charge is of course highly undesirable.

The present invention contemplates the provision of a metallic static discharge wire incorporated with the tubing so that the potential caused by the friction of the fluid passing through the inner tube is constantly discharged, together with a simplified and novel coupling arrangement and a method of assembly therefor, whereby the coupling is electrically connected to the discharge wire in a highly simplified and efficient arrangement, and without the necessity of extensive preparations and work operations.

Accordingly, an object of the invention is to provide an improved composite tubing including means for constantly discharging an electrical charge produced by the friction of a fluid passing through the tubing.

Another object of the invention is to provide a tubing of the latter type in conjunction with a coupling assembly, with the latter being readily assembled with the tubing in positive electrical contact with the discharge wire therein, and in a simplified and efficient assembly operation.

A still further object of the invention is to provide a tubing and coupling arrangement of the latter type and an efficient and simplified assembly procedure for the same.

Other objects and advantages of the invention will be apparent from the following description taken in conjunction with the accompanying drawings wherein:

FIG. 1 is a broken, partially sectional view and partially cutaway view, of a composite tubing member produced in accordance with the instant invention;

FIG. 2 is a transverse cross sectional view taken generally along the line 2—2 of FIG. 1;

Figure 7:
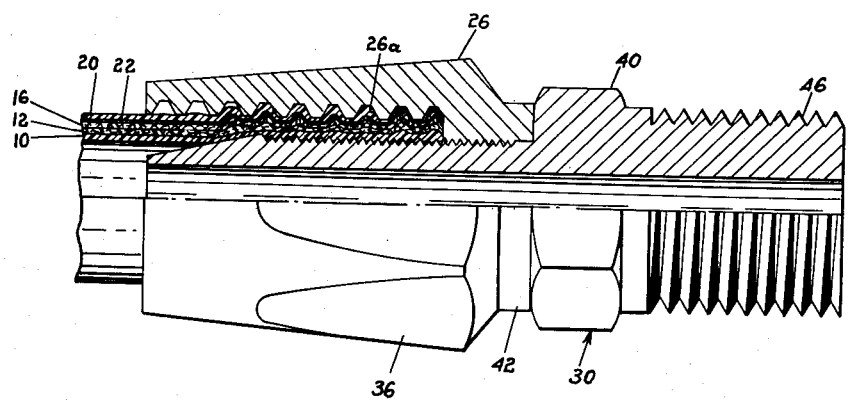

FIG. 3 is an exploded, side elevational view, showing the outer sheath of the composite tubing having been cut away to expose the underlying discharge wire, and with the parts of the two-piece coupling ready for assembly with such cut end of the tubing proper, to provide for positive electrical contact between the discharge wire and the coupling and the ready and efficient assembling of the coupling with the tubing;

FIG. 4 is an assembled view of the tubing and coupling arrangement shown in FIG. 3;

FIG. 5 is a longitudinal sectional view of the collar member of the coupling, as taken along line 5—5 of FIG. 3, looking in the direction of the arrows;

FIG. 6 is an enlarged, fragmentary, sectional view illustrating in detail the threads on the shank of the insert member of the coupling;

FIG. 7 is an enlarged, partially sectioned view of the FIG. 4 assembly.

Referring now again to the drawings and more particularly to FIGS. 1 and 2 thereof, there is shown a piece of composite tubing T, comprising an inner tube or core 10 of nylon, such inner tube being adapted to carry the flow of fluid therethrough. Surrounding the inner tube is a first tubular and braided reinforcing member or sleeve 12 in which a plurality of strands 14 have been preferably machine braided about the inner tube, using a regular weave. Superimposed over the first braided layer is a second reinforcing tubular braided layer 16 woven in substantially the same manner as the first braided layer. In the example illustrated in FIGS. 1 and 2, the second reinforcing member is composed of strands 18 braided about the first reinforcing member using a regular weave. The strand material in each case is preferably composed of poly (alkylene terephthalate) ester fiber, specifically poly (ethylene terephthalate) ester, commonly available as "Dacron," although other material, such as regenerated cellulose or nylon, could be used for the braided reinforcing members. Superimposed over the second reinforcing member is a relatively thin outer sheath 20 of material, such as nylon, or polyurethene, or vinyl, preferably extruded over and covering tightly the reinforcing braided member 16. It is desirable to compound nylon used in extruding the outer sheath 20 with a small amount of carbon black, which serves to protect the nylon from the deleterious effects of exposure to ultraviolet light, but any other ultraviolet light stabilizer may be used in place of part or all of such carbon black. Reference may be had to the pending United States patent application of Robert E. Brumbach filed July 16, 1959 under Serial No. 827,535 for a more detailed description of a suitable tubing and its method of manufacture.

In accordance with the instant invention, means is provided in the composite tubing for constantly discharging any electrical charge produced by the friction of the fluid passing through the inner core tube 10. Such means, in the embodiment illustrated, takes the form of a braided copper wire 22, which is of generally flat configuration, and which is preferably tinned on its exterior. Such wire element is disposed intermediate the outer sheath 20 and the second reinforcing member or sheath 16 of braided material, and extends linearly in a direction axially of the tubing for the latter's full length, and parallel to the lengthwise axis of the tubing. Such wire can be assembled with the composite tubing prior to the extrusion of the outer sheath 20 therearound, and thus is held in positively secured relation with the tubing. Spaced markings 24 may be provided along the exterior of the composite tubing for indicating the position of the wire 22 in the tubing assembly.

Referring now to FIGS. 3, 4 and 5, there is illustrated a coupling or fitting for assembly with each end of the tubing, for connecting the same with the aforementioned mechanical devices, such as a pump or a flow gun, and in fluid tight relation, to provide for the leak-free passage of fluid through the tubing assembly and for grounding the latter from either end thereof.

Such a coupling takes the form of a ferrule or collar element 26 which is internally threaded as at 26a for gripping engagement with the receiving end 28 (FIG. 3) of a piece of the aforementioned composite tubing, and an elongated insert member 30 which is adapted to engage in threaded coaction with the ferrule member 26. In this connection, ferrule member 26 is provided with an axially extending internally threaded portion 32 adapted for coaction with externally threaded shank portion 34 of the insert member 30. The free end of shank portion 34 is tapered as at 34a to provide a truncated conical tip, for facilitating the movement of the insert member 30 into the receiving end of the tubing.

Ferrule member 26 is provided with external planar surfaces 36 for ease of gripping and thus facilitating the movement of the ferrule onto the receiving end of the tubing. The crests of the threads of threaded portion 26a of ferrule 26 are preferably flattened or rounded, in order to aid in preventing such threads from cutting or notching the exterior sheath 20 of the tubing. Likewise, the crests of the threads of threaded shank portion 34 of insert member 30 are rounded to aid in preventing the cutting of the inner tube 10 during movement of the insert member into such inner tube, thereby increasing the "split resistance" of the tubing assembly. FIG. 6 is an enlarged sectional detail view of a suitable thread arrangement for the shank portion 34 of the insert member.

In preparing a piece of tubing for assembly with the coupling, a section of the outer sheath 20 of the tubing is removed or cut from the underlying discharge wire 22 at each end thereof, and as shown in FIG. 3, to expose a portion of such wire to the exterior circumference of the tubing. The ferrule member 26 is then threaded or moved onto the respective receiving end of the tubing in preferably gripping engagement with the material of the outer sheath 20. This may be only a slight gripping engagement, thus facilitating the movement of the ferrule member onto the end of the tubing. An abutment 38 may be provided on ferrule member 26 to limit the movement of the end of tubing into the ferrule. Insertion of the insert member 30 into the threaded portion 32 of the ferrule member is then accomplished and the threaded shank portion 34 of the insert member coacts with the internally threaded portion 32 of the ferrule member to move the shank 34 into the inner tube 10 of the tubing, member 26 being held stationary while insert member 30 is rotated. During such movement of the shank into the tubing, the inner tube 10 is caused to radially expand by the pressure applied thereto by the shank 34, and thus the outer sheath 20 of material is forced into positive gripping coaction with the threaded portion 26a of the ferrule member to securely retain the coupling or fitting on the tubing, and the exposed end of the discharge wire 22 is urged into positive electrical contact with the ferrule member. A shoulder 40 is provided on the insert member 30 for coaction with a stop 42 on one end of the ferrule member to limit telescoping movement of the insert member into the tubing and into the ferrule member to a predetermined amount. It will be noted that the shank portion 34 of the insert member is of substantially the same axial length as the axial length of the ferrule member, to thereby cause positive gripping of the tubing by the ferrule member throughout substantially the latter's full length. Insert member 30 has an axial opening 44 extending completely therethrough for passing fluid, and is provided with an externally threaded end portion 46 for connection through a complementary internally threaded member, such as a coupling, to a pump or flow gun.

In the assembled condition of the coupling with the tubing, the coupling is held in positive secured relation with the tubing, with the discharge wire 22 being positively urged into electrical contact with the coupling element. When such tubing and coupling assembly is connected to a mechanical device, such as a pump, the assembly is positively grounded to the device, thus preventing any build up of an electrical charge on the tubing due to the frictional passing of fluid therethrough.

From the foregoing description and accompanying drawings it will be seen that the present invention provides an improved composite tubing embodying a static discharge wire therein extending throughout its axial length, for continuously discharging any potential that may be built up by the passage of fluid through the tubing, and wherein such tubing may be conveniently and efficiently connected to an associated coupling in a rapid and expeditious manner, for making a positive contact between the discharge wire and the coupling and for positively holding the coupling in assembled relation with the receiving end of the tubing.

The terms and expressions which have been used are used as terms of description and not of limitation, and there is no intention in the use of such terms and expressions of excluding any equivalents of the invention shown or described, or portions thereof, but it is recognized that various modifications are possible within the scope of the invention claimed.

We claim:

1. In combination, a composite tubing and a coupling assembly, said composition tubing comprising an inner tube of polymeric material, an outer sheath of polymeric material encasing said inner tube, a flattened strip electrical discharge element disposed intermediate said inner tube and said outer sheath and extending generally linearly and parallel to the axis of said tubing and coextensive with the length of the tubing, an end of said discharge element adjacent one end of said tubing being exposed to the exterior circumference of said tubing, said coupling assembly comprising a ferrule element having an internally threaded portion receiving said one end of said tubing therein, an elongated insert member, said insert member having an axially extending passageway therethrough, means on said ferrule member adapted for coaction with means on said insert member for holding said insert member in predetermined telescoped relation in said ferrule member, said insert member being received in said inner tube and expanding the latter radially outwardly and urging said tubing into positive gripping engagement with said threaded portion of said ferrule member, and the exposed end of said discharge element is displaced in positive electrical contact with said threaded portion of said ferrule member.

2. The combination in accordance with claim 1, including reference means disposed on the outer surface of said sheath in overlying relation to said discharge element to visually indicate the location of said discharge element with respect to said tubing.

3. The combination in accordance with claim 1, wherein said means on said ferrule member and on said insert member comprises complementary threaded portions which move said insert member axially of said ferrule member upon insertion thereinto of said insert member.

4. The combination in accordance with claim 1, including means on said ferrule member and on said insert member for limiting the maximum telescoping movement of said insert member into said ferrule member.

5. In combination, a composite tubing and a coupling assembly, said tubing comprising an inner tube of polymeric material, at least one layer of filaments braided about said inner tube to form a tubular reinforcing member, a relatively thin outer sheath of polymeric material encasing said reinforcing member, and a flatttened strip electrical discharge element disposed intermediate said reinforcing member and said outer sheath and extending generally linearly and parallel to the axis of said tubing and coextensive with the length of the tubing, a section of said sheath generally immediately overlying an end of said discharge element adjacent one end of said tubing being removed to expose said end of said discharge element to the exterior circumference of said tubing, said coupling assembly comprising a ferrule element having an internally threaded portion receiving said one end of said tubing therein, the axial length of said threaded portion being substantially greater than the axial length of said exposed end of said discharge element, an elongated insert member comprising a shank portion externally threaded for the greater portion of its length, said insert member having an axially extending passageway therethrough, said shank portion of said insert member being adapted to be received in telescoped relation in said inner tube and in said ferrule member, internal threaded means on said ferrule member adapted for coaction with the threads on said shank portion of said insert member for maintaining said telescoped relation of said insert member, abutment means on said ferrule member and on said insert member limiting the maximum telescoping movement of said shank portion of said insert member into said ferrule member and into said inner tube, said shank portion being received in said inner tube and expanding the latter radially outwardly and urging said tubing into positive gripping engagement with said threaded portion of said ferrule member commencing at the innermost end of the last mentioned threaded portion and extending axially outwardly therefrom for the greater portion of the length of said last mentioned threaded portion, and the exposed end of said discharge element is displaced in positive electrical contact with said threaded portion of said ferrule member adjacent said innermost end of said threaded portion.

References Cited in the file of this patent
UNITED STATES PATENTS

| | | |
|---|---|---|
| 2,103,758 | Seyfried | Dec. 28, 1937 |
| 2,200,967 | Phillips | May 14, 1940 |
| 2,224,635 | Williamson | June 3, 1941 |
| 2,810,594 | Walsh et al. | Oct. 22, 1957 |

FOREIGN PATENTS

| | | |
|---|---|---|
| 635,926 | Great Britain | Apr. 19, 1950 |
| 813,151 | Great Britain | May 13, 1959 |

OTHER REFERENCES

Ser No. 218,848, C. M. Beckett (A.P.C.), published June 8, 1943.